Nov. 28, 1961 B. F. TURKOVICH 3,010,713
COUNTERBALANCE
Filed Jan. 19, 1956 2 Sheets-Sheet 1

INVENTOR.
Branimir F. Turkovich
BY
Elroy J. Wintschel
Attorney

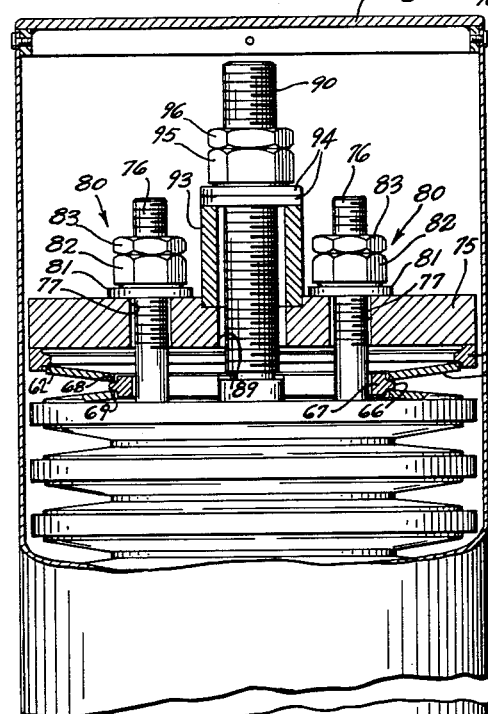
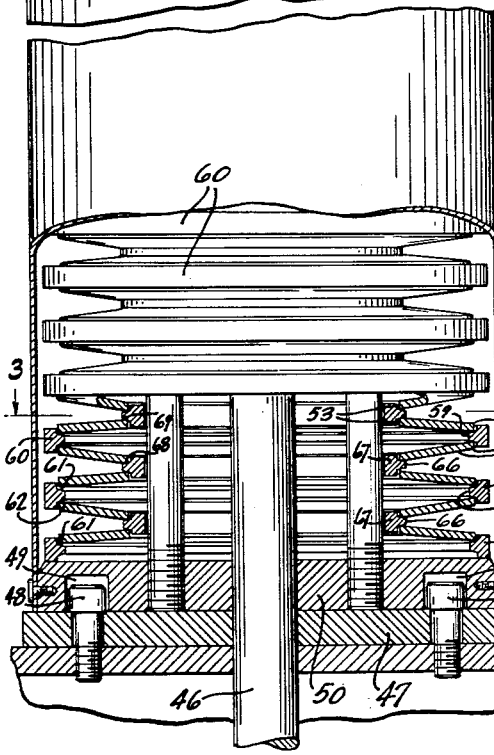
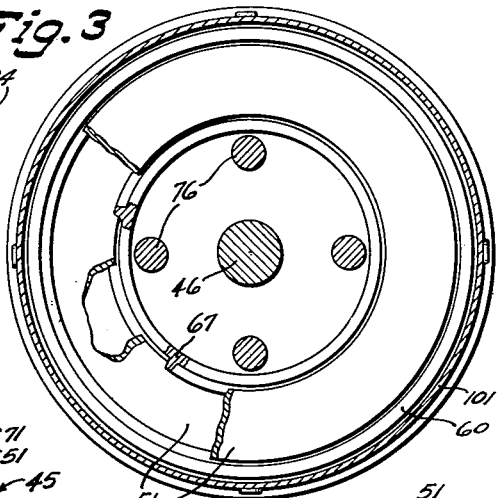
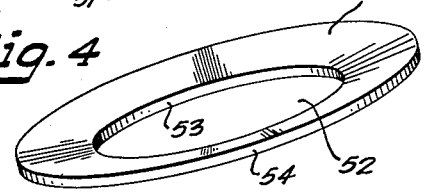
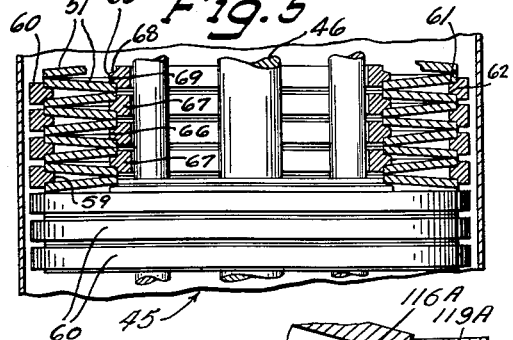
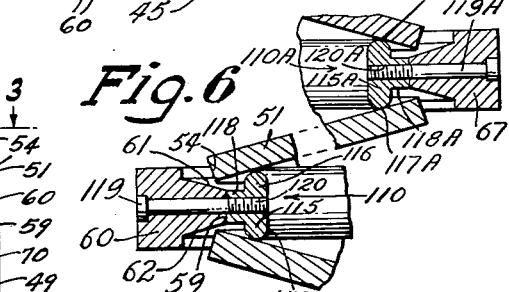
INVENTOR.
Branimir F. Turkovich

United States Patent Office 3,010,713
Patented Nov. 28, 1961

3,010,713
COUNTERBALANCE
Branimir F. Turkovich, Milwaukee, Wis., assignor to Kearney & Trecker Corporation, West Allis, Wis., a corporation of Wisconsin
Filed Jan. 19, 1956, Ser. No. 560,236
12 Claims. (Cl. 267—1)

This invention relates generally to counterbalances and more particularly to an improved Belleville spring counterbalance for counterbalancing a movable member of a machine.

Heavy machine members that are movable in a vertical direction require the use of a counterbalance for the purpose of facilitating their movement in both the upward and downward direction. The employment of such counterbalances is particularly prevalent in machine tools that are provided with a relatively heavy member that must be moved downwardly and upwardly with considerable accuracy. A variety of mechanisms have been utilized for this purpose, as for example, a counterweight and chain over a pulley, spring mechanisms, and hydraulic arrangements. These various means for counterbalancing a movable machine member are inconvenient to incorporate into the machine by reason of the fact that they are of substantial weight and cumbersome, or involve complex mechanisms to effect the desired results.

It is therefore a general object of the present invention to provide an improved counterbalance for counterbalancing a movable machine member.

Another object of the present invention is to provide an improved spring counterbalance.

Another object is to provide an improved Belleville spring especially adapted to function as a counterbalance for facilitating the vertical movement of a machine member.

Another object is to provide a Belleville spring with improved characteristics to render it particularly adaptable to function as a counterbalance.

Another object is to provide an improved counterbalance of minimum weight and bulk that is simple in construction but efficient in operation.

Another object is to provide a spring counterbalance that may be assembled as a unit and preloaded before mounting it upon the machine in which it is to function.

A further object is to provide a Bellevile spring that develops a minimum amount of friction in its operation.

A further object is to provide a Belleville spring that forms a rigid column in which the individual disks that form the spring cannot be displaced relative to each other.

According to this invention the improved counterbalance is a Belleville spring comprised of a plurality of disks having a central bore. They are formed into a frusto-conical shape which will yield toward a flattened configuration when subjected to a compressive force and will yield further beyond the flattened condition to a frusto-conical configuration in the direction opposite to their normal position so that the truncated cone extends from the opposite side of the disk. Such action of the disks serves to increase the effective counterbalancing range of the Belleville spring and is made possible by the unique mounting of the disks on bearing rings as they are stacked, one upon another, with adjacent disks facing in opposite directions to form the Belleville spring. Interior bearing rings are provided for supporting the disks at their inner diameter and exterior bearing rings are employed for supporting the disks at their outer diameter. Each of the rings presents two annular bearing surfaces for engagement with the disks and the interior and exterior rings are alternately disposed so that each disk has its inner diameter in engagement with the annular bearing surface of an interior ring and its outer diameter in engagement with the annular bearing surface of the succeeding exterior ring in the column. The last mentioned exterior ring also supports the outer diameter of the succeeding disk with the latter having its inner diameter in engagement with the succeeding interior ring in the column. Thus, the plurality of disks are supported by the cooperating interior and exterior rings to form a column that is yieldable axially but rigid laterally in that the possibility of lateral deflection is reduced to a minimum because the interior and exterior rings serve to prevent sidewise movement of the disks relative to each other.

The Belleville spring thus formed is particularly well adapted to be employed as a counterbalance for a vertically movable member of a machine, and to this end is mounted on the frame of the machine. Suitable linkage is provided to connect the spring to the movable member so that the spring is compressed by the downward movement of the member and is released as the member moves upwardly. The characteristics of the Belleville spring are such that after preloading in accordance with the weight of the movable member, very little additional force is required to deflect the spring through the range of movement of the machine member to thereby render the spring ideally suited to function as a counterbalance. Furthermore, the range in which the spring may be deflected with the application of very little additional force is extended substantially by the employment of the interior and exterior bearing rings which permit the disks to be deflected beyond their flattened condition into a reversed frusto-conical configuration with the conical portion extending from the side opposite the side from which it will normally extend when the disk is not under compression.

The foregoing and other objects of this invention, which will become more fully apparent from the following detailed description, may be achieved by the particular embodiment depicted in and described in connection with the accompanying drawings, in which:

FIG. 2 is an enlarged view partly in elevation and partly in vertical section of one of the Belleville springs shown assembled to the machine in FIG. 1;

FIG. 3 is a view in horizontal section taken along the plane represented by the line 3—3 in FIG. 2;

FIG. 4 is a detail perspective view of one of the disks that form the Belleville spring illustrated in FIG. 2;

FIG. 5 is a fragmentary view of the Belleville spring shown in FIG. 2, partly in vertical section and partly in elevation, illustrating the position of the disks when the spring is fully compressed;

Figure 7:
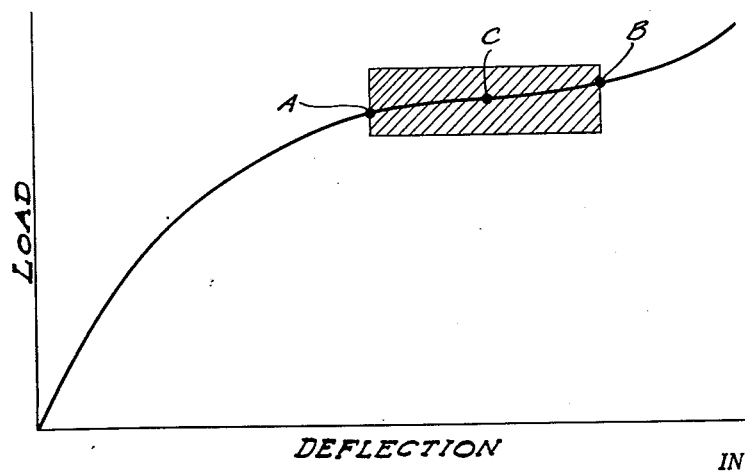

FIG. 6 is an enlarged fragmentary detail view in vertical section of a pair of bearing rings with adapter rings attached to their inner and outer peripheries, respectively, to change the bearing point of the disks for the purpose of changing the characteristics of the Belleville spring; and, FIG. 7 is a load-deflection curve constituting a graphic illustration of the characteristics of the spring depicted in FIG. 2.

Figure 1:
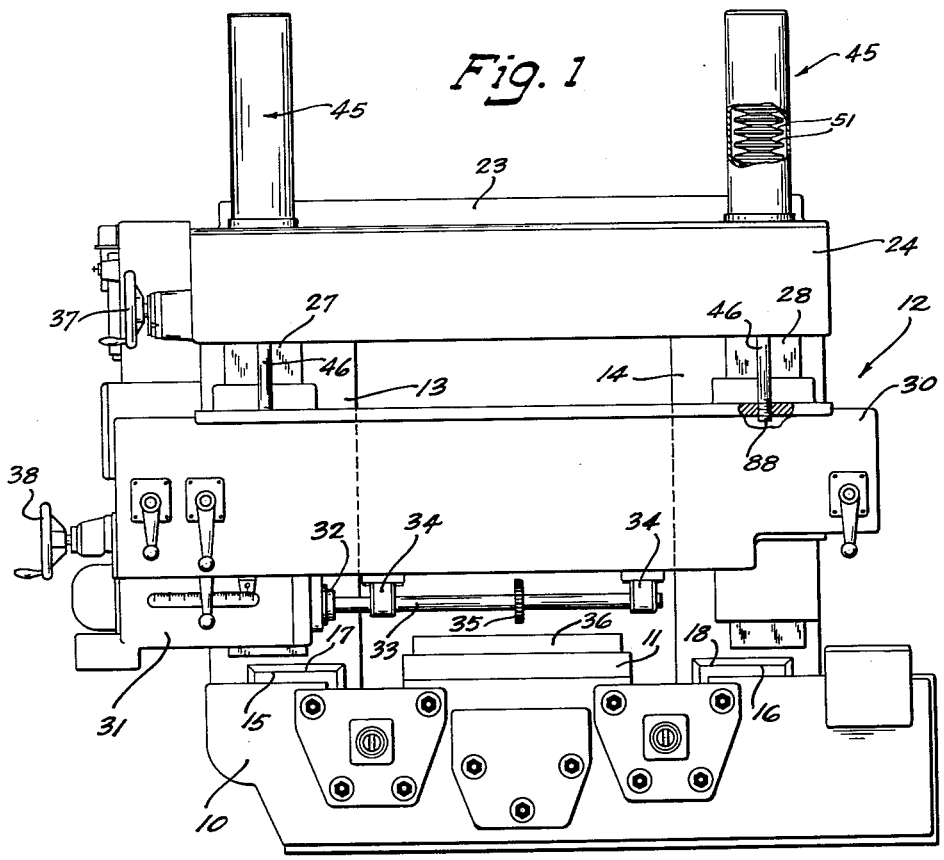
FIGURE 1 is a side elevational view of a machine tool having a vertically movable rail that is counterbalanced by Belleville springs in accordance with the teachings of the present invention.

Reference is now made more particularly to the drawings and specifically to FIG. 1 thereof illustrating a milling machine that incorporates a counterbalance which embodies the principles of the present invention. The machine tool shown comprises a base 10 that carries a fixed work supporting table 11. The base 10 also slidably supports a gantry generally identified by the reference numeral 12 which is mounted for movement along the length of the base 10, an end of which is depicted in FIG. 1.

The gantry 12 comprises a pair of upstanding columns 13 and 14 that are provided with horizontal ways 15 and 16 on their lower ends for cooperating with complementary horizontal ways 17 and 18 respectively, that are formed on the upper surface of the base 10. It is apparent therefore, that the ways 17 and 18 provide a bearing surface for the ways 15 and 16 to slidably support the gantry 12 for horizontal movement along the base 10. The columns 13 and 14 are connected at their upper ends by a gantry bridge 23 which includes an overhanging portion 24 that extends laterally from the bridge 23.

The columns 13 and 14 are provided with vertical way surfaces 27 and 28 formed on their faces for cooperation with complementary way surfaces (not shown) formed on the rear of a rail 30 to slidably support the rail for vertical movement beneath the overhanging portion 24 of the gantry bridge 23. A spindle head 31 is slidably supported by the rail 30 for rotating a spindle 32 which is adapted to drive an arbor 33 that is journalled in suitable arbor supports 34 depending from the underside of the rail 30. A cutter 35 is keyed to the arbor 33 to rotate with it for operating upon a workpiece 36 which is clamped to the work supporting table 11 in a well known manner. Vertical movement of the rail 30 is effected through a suitable screw and nut mechanism (not shown) in the conventional manner, which may be actuated by power, or manually by revolving a handwheel 37. The spindle head 31 is movable in a horizontal direction along the length of the rail 30 for the purpose of moving the cutter 35 axially to position it relative to the workpiece. Such movement of the spindle head 31 is accomplished manually by revolving a handwheel 38.

In order to facilitate the vertical movement of the rail 30, the illustrated milling machine incorporates a unique counterbalancing arrangement which comprises a pair of Belleville springs 45 mounted on the top of the overhanging portion 24 and connected to the rail 30 by connector bars 46. The Belleville springs 45 are identical in construction, and two such springs are shown in FIG. 1 as a convenient arrangement for the particular machine tool organization with which they cooperate. However, it is to be understood that any number of such units may be employed to suit the particular application.

The details of the construction of the Belleville springs 45 is best shown in FIG. 2 and includes a circular base 47 fixed upon the top surface of the overhanging portion 24 by cap screws 48 which extend through openings in the base 47 into threaded engagement with the top plate of the overhanging portion 24. The heads of the cap screws 48 protrude above the top surface of the base 47 for insertion into recesses 49 that are formed in the bottom surface of a bottom plate 50 which rests upon the circular base 47. The location of the heads of the cap screws 48 in the recesses 49 serves to retain the bottom plate 50 and its associated structure in the proper position upon the base 47.

The bottom plate 50 functions to support a plurality of disks 51 that produce the yieldable property of the Belleville spring 45. To this end, the disks 51, shown in detail in FIG. 4, are tapered to form a frusto-conical configuration which may be yieldably deformed by compression to a flattened condition and beyond the flattened condition to frusto-conical configuration in a direction opposite to its normal position to provide the spring effect. Each of the frusto-conical disks 51 is provided with an axial bore 52, to form an inner diameter 53 with the disk being tapered from its outer diameter 54 to the inner diameter 53 to form the frusto-conical configuration.

The disks 51 are stacked in oppositely facing relationship to form a column of disks that is supported by the bottom plate 50. Since the disks are arranged in opposite facing relationship, pairs of the outer diameters 54 will be adjacent to each other, and similarly, the inner diameters 53 will be adjacent to each other in pairs as clearly shown in FIG. 2. However, the adjacent pairs of outer diameters 54 are prevented from contacting each other by an annular protrusion 59 that extends inwardly from the inner diameter of exterior bearing rings 60 with each of the annular protrusions 59 being disposed between a pair of adjacent outer diameters. Each of the annular protrusions 59 presents a top bearing surface 61 and a bottom bearing surface 62 for receiving the two adjacent outer diameters of a pair of disks 51.

In similar manner, the adjacent inner diameters 53 of the disks 51 are prevented from contacting each other by a plurality of annular protrusions 66 extending outwardly from the periphery of interior bearing rings 67. Each of the annular protrusions 66 presents an annular top bearing surface 68 and an annular bottom bearing surface 69 for receiving the adjacent inner diameters 53 of two of the disks 51.

It is apparent from the view in FIG. 2 that a lowermost exterior bearing ring 70 is identical in construction to the exterior bearing ring 60, but it supports only the outer diameter 54 of the bottom disk 51 on its top annular bearing surface 61 and has no disk in contact with its bottom annular bearing surface 62. Instead, its bottom face is in contact with the bottom plate 50 to prevent the bottom one of the disks 51 from contacting the bottom plate 50. In like manner, an uppermost exterior bearing ring 71 is identical in construction to the exterior bearing rings 60 but has only the top one of the disks 51 in contact with its bottom annular bearing surface 62. The upper face of the exterior bearing ring 71 is in contact with a top plate 75 through which the compressive forces are applied to the spring.

As clearly illustrated in FIG. 2, the two disks 51 of each pair that have their adjacent outer diameters 54 in engagement with the same annular protrusion 59 of an exterior bearing ring 60, have their inner diameters 53 separated, and each of these separated inner diameters of the pair of disks 51 is in engagement with a different annular protrusion 66 of two separate bearing rings 67. In like manner, of course, any two of the disks 51 that have their inner diameters in engagement with the same annular protrusion 66 of a single interior bearing ring 67, have their outer diameters 54 separated, and each of these separated outer diameters of the pair of disks 51 is in engagement with the annular protrusion 59 of a different exterior bearing ring 60. With this arrangement, all of the disks 51 are tied together against lateral movement relative to each other to form a unitary structure and a rigid column. Since the disks 51 are precluded from lateral movement relative to each other by reason of their engagement with the interior bearing rings 67 and the exterior bearing rings 60, the friction which attends such movement is eliminated to improve the efficiency of the spring.

The column of disks 51 is maintained in alignment with the bottom plate 50 by four mounting rods 76 which are in threaded engagement with the bottom plate 50 at equally spaced intervals in proximity to its periphery and extend upwardly therefrom through the openings of the interior bearing rings 67 and suitable openings 77 formed in the top plate 75 so that the upper extremities of the mounting rods 76 protrude beyond the upper face of the top plate 75. These protruding ends of the mounting rods 76 are threaded for receiving adjustable stops 80 which function with the mounting rods 76 to enable the spring to be assembled as a unit and to be preloaded before connecting the spring to the machine with which it is to operate.

Each of the adjustable stops 80 comprises a washer 81 placed about the mounting rod 76 to rest upon the top face of the plate 75 for receiving a nut 82 which is threaded on the mounting rod 76. Therefore, in order to preload the spring 45 it is only necessary to thread the nuts 82 downwardly on the mounting rods 76 for the purpose of compressing the spring 45 the desired amount. When the desired compression of the spring 45 has been attained, each of the nuts 82 may be locked in position by tightening a lock nut 83 against the nut 82 to prevent its further rotation. It is apparent therefore, that the spring 45 may be applied and removed from the machine with which it operates as a unit assembly, and that to disassemble the spring 45 after it has been removed from the machine, it is only necessary to remove the adjustable stops 80 from the mounting rods 76 to render all of the parts of the spring conveniently removable.

As previously mentioned, the Belleville springs 45 are mounted on the overhanging portion 24 of the gantry bridge 23 for the purpose of counterbalancing the weight of the vertically movable rail 30. To this end, the spring is connected to the rail 30 as shown in FIG. 1 by means of a threaded end 88 of the connector bar 46 which is in threaded engagement with a structural member of the rail 30. The connector bar 46 extends upwardly from this connection through the overhanging portion 24, the central opening of the Belleville spring 45, and an axial bore 89 formed in the top plate 75, to extend above the latter member where it presents a threaded end 90.

The bore 89 is countersunk for receiving a collar 93 which encircles the threaded end 90 of the connected bar 46. A pair of washers 94 are disposed on the top of the collar 93 to provide a bearing surface upon which a nut 95 may be tightened, the latter being in threaded engagement with the threaded end 90. A lock nut 96 is likewise in threaded engagement with the threaded end 90 for the purpose of tightening it against the nut 95 to lock it in position. With the connector bar 46 thus connected to the rail 30 and the top plate 75, it is apparent that the spring 45 will function with the movement of the rail 30 to produce the desired counterbalancing effect. As the rail 30 moves downwardly, the connector bar 46 will move with it by reason of its connection therewith through the threaded end 88 to cause a like downward movement of the top plate 75 to compress the spring an amount equivalent to the distance of movement of the rail 30. In like manner, movement of the rail 30 in the upward direction will produce a like movement of the connector bar 46 to release the spring 45 from its compressed condition.

The spring 45 is protected from dirt by a cylindrical housing 101 which serves to completely enclose the column of disks 51. The cylindrical housing 101 is secured at its bottom end to the periphery of the bottom plate 50 by screws 102 and extends upwardly therefrom to a point above the upper end of the connector bar 46. A removable cover 103 is attached to the top end of the housing 101 by screws 104 to provide access to the top portion of the spring 45.

The view in FIG. 5 illustrates the position of the disks 51 when the spring 45 is in its fully compressed condition with the disks 51 fully deformed from their normal frusto-conical configuration to a reversed frusto-conical configuration wherein the truncated cone extends from the opposite side of the disk. It will be noted that each exterior bearing ring 60 provides two bearing surfaces 61 and 62 for receiving the outer diameters of two disks 51, and these outer diameters are separated by the annular protrusion 59. Normally both of these disks 51 taper outwardly from the annular protrusion 59 so that a greater separation exists between their inner diameters 53. However, when the spring is fully compressed, these inner diameters 53 are forced into juxtaposition, as shown in FIG. 5, so that the disks 51 are tapered in the opposite direction by reason of the fact that the protrusion 59 maintains the separation of their outer diameters 54. Their frusto-conical configuration is therefore reversed from its normal position.

The curve presented in FIG. 7 is a graphic illustration of the property that renders the Belleville spring of the present invention particularly well adapted to function as a counterbalance for a movable machine member. The ordinate of the curve represents the load applied to the spring and the abscissa represents the deflection of the spring. It will be noted that upon the initial application of the load the amount of deflection is substantially proportional to the value of the load applied. However, as the load on the spring increases, the amount of deflection per unit of load increases substantially until further deflection of the spring occurs with very little increase in the load. This property is taken advantage of in utilizing the Belleville spring as a counterbalance by designing the spring to operate in the range indicated by the flat portion of the curve through the distance of movement of the movable machine member. The flat portion of the curve through which the spring will operate with the movement of the movable member is indicated by the shaded area in FIG. 7, and the deflection of the spring, as represented by the length of the shaded area, is equal to the distance of movement of the machine member.

Thus, the spring is preloaded by an amount represented by the point A on the curve shown in FIG. 7, and for maximum efficiency, this preload on the spring is substantially equal to the weight of the movable member which is to be counterbalanced if only one spring 45 is employed. In the illustrated embodiment, two Belleville springs 45 are utilized, so each spring would be preloaded by an amount equal to one-half of the weight of the rail 30. After the springs 45 are preloaded in this manner, the rail 30 is moved to its uppermost limit of travel and the springs 45 are connected to it by assembling the connector bars 46 in the manner previously described. Downward movement of the rail 30 will then operate to compress the springs further, and at the lowermost limit of travel of the rail 30, the springs will be deflected an amount represented by the point B on the curve in FIG. 7.

It is obvious, therefore, that through its distance of travel, the rail 30 causes the Belleville springs 45 to be deflected an equal distance, as represented by the portion AB of the curve shown in FIG. 7. But, it is also apparent from the curve, that a relatively small additional load is required to effect the deflection represented by the distance from A to B on the curve so that very little force is expended in compressing the springs 45 beyond their condition after the preload equal to the weight of the rail 30 has been applied. Furthermore, since such load on the springs 45, as represented by the point A on the curve, is substantially equal to the weight of the rail 30, the springs are exerting this force in a direction to raise the rail 30 and thereby effectively counterbalance its weight so that a minimum of power is required to actuate it in its vertical path of movement along the ways 27 and 28.

The addition of the bearing rings 60 and 67 serves to increase the range through which a substantial deflection of a Belleville spring will occur with a relatively small variation in the load. A given Belleville spring provided with the bearing rings 60 and 67 will therefore operate to efficiently counterbalance a movable machine member through approximately twice the distance of movement that the spring would function satisfactorily if the bearing rings 60 and 67 were omitted. Such improved operation is achieved by reason of the fact that the addition of the bearing rings 60 and 67 enable the individual disks 51 to be deformed beyond their flattened condition, into a frusto-conical configuration in the direction opposite to their normal position.

Thus, the curve in FIG. 7 illustrates the characteristics of a specific Belleville spring equipped with the bearing rings 60 and 67. It has been found that in deflecting this spring, the disks 51 are in their flattened condition when the deflection represented by the point C on the curve is reached. In the absence of the bearing rings 60 and 67, this point would therefore establish the limit of deflection of the spring because the disks 51 could not be deformed beyond their flattened condition. The effective counterbalancing range of the spring without the bearing rings 60 and 67 is then represented by the portion AC of the curve.

On the other hand, the portion CB of the curve represents the deflection of the spring while the disks 51 are being deformed from their flattened condition to a frusto-conical configuration in the direction opposite to their normal position. It is therefore apparent that the effective counterbalancing range of the spring as represented by the portion AB of the curve is approximately doubled by the inclusion of the bearing rings 60 and 67 without changing the dimensions of the disks 51. Obviously, therefore, the employment of the bearing rings 60 and 67 permits the use of considerably smaller springs 45 for counterbalancing a movable machine member through a specific range of travel.

The characteristics of the Belleville spring 45 depend upon the number of disks 51 in the assembly, the dimensions of the disks 51, and the location of their bearing points. If the position of their bearing points is varied, their effective dimensions will vary, causing the characteristics of the spring to likewise vary, and to this end, a pair of adapters, illustrated in FIG. 6 and generally identified by the reference numerals 110 and 110A are provided for the purpose of changing the bearing points of the disks 51. With this arrangement, springs having different characteristics may be furnished to accommodate various situations without changing the dimensions of the disks 51. Thus, by the inclusion of the adapters 110 and 110A, either individually or in combination, the same disks 51 may be employed in springs of different characteristics, or the characteristics of a particular spring may be changed by the addition of suitable adapters 110 and 110A.

The adapters 110 and 110A are provided to be employed in conjunction with the bearing rings 60 and 67, the adapter 110 being shown applied to the bearing ring 60 and the adapter 110A being shown assembled to the bearing ring 67. Although only one of each of the adapters 110 and 110A are shown, it is to be understood that it is intended that an adapter 110 be secured to each of the exterior bearing rings 60 and an adapter 110A will be secured to each of the bearing rings 67 that form a part of the Belleville spring. The adapter 110 comprises a ring 115 having an annular bearing surface 116 of semicircular cross section at its upper extremity and a similar annular bearing surface 117 of semicircular cross section at its lower extremity. An annular lateral extension 118 extends from the periphery of the ring 115 to abut the inner diameter of the annular protrusions 59 of the exterior bearing ring 60. The adapter 110 is secured to the exterior bearing ring 60 by a plurality of cap screws 119 that extend through radial holes in the exterior bearing ring 60 into threaded engagement with complementary radial threaded openings 120 formed in the adapter 110.

It is apparent from the view in FIG. 6 that the annular bearing surface 116 extends above the plane of the top bearing surface 61 of the exterior bearing ring 60, and the annular bearing surface 117 similarly extends below the plane of the bottom bearing surface 62 of the bearing ring 60. With the annular bearing surfaces 116 and 117 thus located, they interfere with the seating of the outer diameters 54 of the two disks 51 on the top and bottom bearing surfaces 61 and 62 respectively. Instead, the disks 51 are caused to bear upon the annular bearing surfaces 116 and 117, and this serves to reduce the effective radius of each of the disks 51 by the distance from the outer diameter 54 to the circle established by the line which is in contact with the annular bearing surface 116 or 117. With the effective radius of each of the disks 51 thus reduced by the annular bearing surface 116 or 117, the characteristics of the spring are changed accordingly.

The reduction of the effective radius of each of the disks 51 may be varied by utilizing different adapters 110 that provide for the relocation of the annular bearing surfaces 116 and 117. This may be conveniently accomplished by varying the depth of the lateral extension 118 along with the diameter of the ring 115 and its associated annular bearings 116 and 117. With this arrangement the characteristics of a Belleville spring may be changed without changing any of the physical dimensions of the disks 51.

Further flexibility in the characteristics of the Belleville spring may be obtained by adding the adapter 110A to the interior bearing ring 67. The adapter 110A is similar in construction to the adapter 110 and operates in the same way to increase the effective inner diameters of the disks 51 rather than reducing their effective outer diameters. The adapter 110A comprises a ring 115A having an annular bearing surface 116A of semicircular cross section at its upper extremity and a similar annular bearing surface 117A of semicircular cross section at its lower extremity. An annular lateral extension 118A extends from the periphery of the ring 115A to abut the inner diameter of the annular protrusions 66 of the interior bearing ring 67. The adapter 110A is secured to the interior bearing ring 67 by a plurality of cap screws 119A that extend through radial holes in the interior bearing ring 67 into threaded engagement with complementary radial threaded openings 120A formed in the adapter 110A.

It is apparent from the view in FIG. 6 that the annular bearing surfaces 116A and 117A interfere with the seating of the inner diameters 53 of the disks 51 on the top and bottom bearing surfaces 68 and 69 respectively. This serves to increase the effective inner diameter of the disks 51 in the same manner that the adapters 110 function to reduce the effective outer diameters of the disks. Both types of adapters can be used either individually or in combination for a greater range in characteristics.

From the foregoing detailed description of an explanation of the operation of the exemplifying Belleville spring counterbalance herein set forth as a practical embodiment of the present invention, it will be apparent that there has been provided an improved counterbalancing mechanism for a movable machine tool member, and an improved Belleville spring of unitary construction particularly well adapted to function very efficiently as a counterbalancing mechanism through a wide range of movement of the machine member and including means to vary its characteristics in order to adjust it to a particular situation.

Although the illustrative embodiment of the invention has been described in considerable detail for the purpose of disclosing a practical operative structure whereby the invention may be practiced advantageously, it is to be understood that the particular apparatus described is intended to be illustrative only and that various novel characteristics of the invention may be incorporated in other structural forms without departing from the spirit and scope of the invention as defined in the subjoined claims.

The principles of this invention having now been fully explained in connection with the foregoing description, I hereby claim as my invention:

1. In a counterbalance for counterbalancing a movable member of a machine having a frame for supporting the movable member; a bottom plate secured to the frame of the machine; a spring formed of a plurality of disks of frusto-conical configuration and having an axial opening, said disks being disposed in oppositely facing relationship in axial alignment with said bottom plate with the bottom disk bearing against said bottom plate; a plurality of rods attached to said bottom plate and extending outwardly therefrom through the openings in said disks for maintaining the disks in axial alignment; a top plate bearing against the top of said plurality of disks and having openings for receiving said rods to render it movable relative to said rods; and a connector attached at one end to said top plate and at its opposite end to said movable member so that the frusto-conical disks will be compressed by the downward movement of said member and will be released from their compressed condition as the member moves upwardly to counterbalance the weight of the member.

2. In a counterbalance for counterbalancing a movable member of a machine having a frame for supporting the movable member; a bottom plate secured to the frame of the machine; a spring formed of a plurality of disks of frusto-conical configuration and having an axial opening, said disks being disposed in oppositely facing relationship in axial alignment with said bottom plate with the bottom disk bearing against said bottom plate; a plurality of rods attached to said bottom plate and extending outwardly therefrom through the openings in said disks for maintaining the disks in axial alignment; a top plate bearing against the top of said plurality of disks and having openings through which said rods extend so that it is movable relative to the rods; an adjustable stop on said rods located exteriorly of said top plate to limit the outward movement of the top plate and thereby establish the limit of expansion of the spring to enable the spring to be preloaded before it is operably connected; and a connector attached at one end to said top plate and at its opposite end to said movable member so that the frusto-conical disks will be compressed by the downward movement of said member and will be released from their compressed condition as the member moves upwardly to counterbalance the weight of the member.

3. In a Belleville spring; a plurality of disks of frusto-conical configuration and having an axial bore, said disks being stacked in oppositely facing relationship to form a column; a plurality of exterior bearing rings; two annular bearing surfaces formed on each of said exterior bearing rings for receiving adjacent outer diameters of two of said disks; an adapter attached to each of said exterior bearing rings; and two annular bearing surfaces formed on each of said adapters and disposed to contact the surface of said two disks along a circle of smaller diameter than their outer diameters and thereby interfere with the seating of their outer diameters on the annular bearing surfaces of said exterior bearing rings; whereby the inclusion of said adapters serves to reduce the effective outer diameters of said disks to change the characteristics of the spring.

4. In a Belleville spring; a plurality of disks of frusto-conical configuration and having an axial bore, said disks being stacked in oppositely facing relationship to form a column; a plurality of interior bearing rings; two annular bearing surfaces formed on each of said bearing rings for receiving adjacent inner diameters of two of said disks; an adapter attached to each of said interior bearing rings; and two annular bearing surfaces formed on each of said adapters and disposed to contact the surfaces of said two disks along a circle of greater diameter than their inner diameters and thereby interfere with the seating of their inner diameters on the annular bearing surfaces of said interior bearing rings; whereby the inclusion of said adapters serves to increase the effective inner diameters of said disks to change the characteristics of the spring.

5. In a Belleville spring; a plurality of disks of frusto-conical configuration and having an axial bore, said disks being stacked in oppositely facing relationship to form a column; a plurality of exterior bearing rings; two annular bearing surfaces formed on each of said exterior bearing rings for receiving adjacent outer diameters of two of said disks; a plurality of interior bearing rings; two annular bearing surfaces formed on each of said interior bearing rings for receiving adjacent inner diameters of two of said disks; an exterior adapter attached to each of said exterior bearing rings; two annular bearing surfaces formed on each of said exterior adapters in position to contact the surfaces of said two disks along a circle of smaller diameter than their outer diameters and thereby interfere with the seating of their outer diameters on the annular bearing surfaces of said exterior bearing rings; an interior adapter attached to each of said interior bearing rings; and two annular bearing surfaces formed on each of said interior adapters and disposed to contact the surfaces of said two disks along a circle of greater diameter than their inner diameters and thereby interfere with the seating of their inner diameters on the annular bearing surfaces of said interior bearing rings; whereby the inclusion of said interior adapters and said exterior adapters serves to vary the effective dimensions of said disks to change the characteristics of the spring.

6. In a Belleville spring; a plurality of disks of frusto-conical configuration and having an axial bore, said disks being stacked in oppositely facing relationship to form a column; a plurality of exterior bearing rings; two annular bearing surfaces formed on each of said exterior bearing rings for receiving adjacent outer diameters of two of said disks; an annular extension attached to the inner diameter of each of said exterior bearing rings; a ring rigidly secured to each of said annular extensions; and two annular bearing surfaces formed on each of said rings in position to be contacted by the surfaces of said two disks along a circle of smaller diameter than their outer diameters to thereby interfere with the seating of their outer diameters on the annular bearing surfaces of said exterior bearing rings; whereby the inclusion of said bearing surfaces on said rings serves to reduce the effective outer diameters of said disks to change the characteristics of the spring.

7. In a Belleville spring; a plurality of disks of frusto-conical configuration and having an axial bore, said disks being stacked in oppositely facing relationship to form a column; an interior bearing ring located at the point of contact of each pair of adjacent inner diameters of said disks; two annular bearing surfaces formed on each of said interior bearing rings for receiving said adjacent inner diameters of two of said disks; an annular extension attached to the periphery of each of said interior bearing rings; a ring rigidly secured to each of said annular extensions; and two annular bearing surfaces formed on each of said rings in position to be contacted by the surfaces of said two disks along a circle of greater diameter than their inner diameters to thereby interfere with the seating of their inner diameters on the annular bearing surfaces of said interior bearing rings; whereby the inclusion of said bearing surfaces on said rings serves to increase the effective inner diameters of said disks to change the characteristics of the spring.

8. In a counterbalance for counterbalancing a movable member of a machine having a frame for supporting the movable member; one or more Belleville springs mounted on said frame; and means operably connected to secure said movable member to said Belleville springs with said springs being preloaded so that at the uppermost limit of travel of the movable member said springs will be compressed to the range at which further deflection of said springs will occur upon the addition of a load which will remain approximately constant during further deflection with said preload plus said constant load approximating the weight of the movable member, and said springs will remain in this range as they are compressed by the downward movement of the movable member to its lowermost limit of travel; whereby said springs will serve to counterbalance the weight of the member.

9. In a counterbalance for counterbalancing a movable member of a machine having a frame for supporting the movable member; one or more springs, each of which is formed of a plurality of disks of frusto-conical configuration and having an axial opening stacked one upon another in opposed relationship, said disks being carried by the frame of the machine; a plate disposed upon the outermost one of said stack of disks; and connecting means connecting said plate to said movable member so that the springs will be compressed by the downward movement of said member and will be released as the member moves upwardly with said springs being preloaded so that at the uppermost limit of travel of the movable member said springs will be compressed to the range at which further deflection of said spring will occur upon the addition of a load which will remain approximately constant during further deflection with said preload plus said constant load approximating the weight of the movable member and said springs will remain in this range as they are compressed by the downward movement of the movable member to its lowermost limit of travel; whereby said springs will serve to counterbalance the weight of the member.

10. In a counterbalance for counterbalancing a movable member of a machine having a frame for supporting the movable member; one or more Belleville springs mounted on said frame and having characteristics which cause them to initially deflect substantially proportionately a unit of deflection per unit of compressive load applied and as the application of the load continues a unit of deflection occurs with a progressively lesser fractional unit of additional load until the load approximates the weight of said movable member when each further unit of deflection will occur upon the addition of a load which will remain approximately constant during further deflection through the entire range of movement of the movable member; and means operably connected to secure said movable member to said Belleville springs with said springs being preloaded so that at the uppermost limit of travel of the movable member said springs will be compressed to the range at which their further deflection will occur upon the application of the preload plus the approximately constant load and said springs will remain in this range as they are compressed by the downward movement of the movable member to its lowermost limit of travel; whereby said springs will serve to counterbalance the weight of the member.

11. In a machine; a frame; a member slidably supported on said frame for movement relative thereto; one or more Belleville springs mounted on said frame and having characteristics which cause them to initially deflect substantially proportionately a unit of deflection per unit of compressive load applied and as the application of the load continues the unit of deflection occurs with a progressively lesser fractional unit of additional load until the load approximates the weight of said movable member when the load necessary for further deflection of said springs through the entire range of movement of said movable member remains substantially constant; and means operably connected to secure said movable member to said Belleville springs with said springs being preloaded so that at the uppermost limit of travel of the movable member said springs will be compressed to the range at which their further deflection will occur upon the application of the preload plus the substantially constant load and said springs will remain in this range as they are compressed by the downward movement of the movable member to its lowermost limit of travel; whereby said springs will serve to counterbalance the weight of the member.

12. In a machine; a frame; a member slidably supported by said frame for movement relative thereto; one or more springs, each of which is formed of a plurality of disks of frusto-conical configuration and having an axial opening stacked one upon another in opposed relationship, said disks being carried by the frame of the machine and having characteristics which cause said springs to initially deflect substantially proportionately a unit of deflection per unit of compressive load applied and as the application of the load continues the unit of deflection occurs with a progressively lesser fractional unit of additional load until the load approximates the weight of said movable member when the load necessary for further deflection of said springs through the entire range of movement of said movable member remains substantially constant; a plate located upon the outermost one of each of said stacks of disks; and a rod extending through the axial openings in said disks and being attached at one end to said movable member and at its opposite end to said plate with said springs being preloaded so that at the uppermost limit of travel of the movable member said springs will be compressed to the range at which their further deflection will occur upon the application of the preload plus the substantially constant load and said springs will remain in this range as they are compressed by the downward movement of the movable member to its lowermost limit of travel; whereby said springs will serve to counterbalance the weight of the member.

References Cited in the file of this patent

UNITED STATES PATENTS

| | | | |
|---|---|---|---|
| 608,344 | Nesmith | Aug. 2, | 1898 |
| 2,162,719 | Hay | June 20, | 1939 |
| 2,263,107 | Smirl | Nov. 18, | 1941 |
| 2,595,642 | Daland | May 6, | 1952 |
| 2,675,742 | Petre | Apr. 20, | 1954 |
| 2,708,110 | Clay | May 10, | 1955 |

FOREIGN PATENTS

| | | | |
|---|---|---|---|
| 123,024 | Austria | May 26, | 1931 |
| 824,126 | Germany | Dec. 10, | 1951 |